United States Patent [19]

Honda et al.

[11] Patent Number: 4,722,823

[45] Date of Patent: Feb. 2, 1988

[54] NUCLEAR POWER PLANT PROVIDING A FUNCTION OF SUPPRESSING THE DEPOSITION OF RADIOACTIVE SUBSTANCE

[75] Inventors: Takashi Honda, Katsuta; Toshio Kawakami, Ibaraki; Masakiyo Izumiya, Mito; Akira Minato; Katsumi Ohsumi, both of Hitachi, all of Japan

[73] Assignee: Hitachi, Ltd., Tokyo, Japan

[21] Appl. No.: 525,889

[22] Filed: Aug. 24, 1983

[51] Int. Cl.⁴ .............................................. G21C 11/00
[52] U.S. Cl. .................................................... 376/306
[58] Field of Search ........................ 376/305, 306, 308; 252/626

[56] References Cited

U.S. PATENT DOCUMENTS

| | | | |
|---|---|---|---|
| 3,873,362 | 3/1975 | Mihrah et al. | 252/626 |
| 4,042,455 | 8/1977 | Brown | 252/626 |
| 4,266,987 | 5/1981 | Wang | 376/305 |
| 4,297,150 | 10/1981 | Foster et al. | 376/305 |

FOREIGN PATENT DOCUMENTS

| | | | |
|---|---|---|---|
| 2613351 | 10/1977 | Fed. Rep. of Germany | 252/626 |
| 0121197 | 9/1980 | Japan | 376/305 |

OTHER PUBLICATIONS

Van Vlack, Elements of Materials Science and Engineering, Addison-Wesley, 1980, pp. 472-474 and 476.
Hodgman et al., Handbook of Chemistry and Physics, CRP, 1960, pp. 588 and 589.

Primary Examiner—Deborah L. Kyle
Assistant Examiner—Richard W. Wendtland
Attorney, Agent, or Firm—Antonelli, Terry & Wands

[57] ABSTRACT

A nuclear power plant using a structural material consisting of metal which comes into contact with a liquid in which radioactive substances are dissolved has a function to suppress the deposition of the radioactive substances. In this function, metal elements constituting the surface layer of the structural material which comes into contact with the liquid are oxidized by injecting oxidizing agents from outside, thereby preliminarily producing an oxide film. The oxidizing agents comprise at least one kind selected from the group consisting of oxygen, hydrogen peroxide, chromate, nitrite, molybdate, tungstate and ferrate. Particularly, by suppressing the deposition of radioactive substances on a stainless steel, the dose rate of exposure of workers is effectively reduced.

28 Claims, 4 Drawing Figures

4,722,823

NUCLEAR POWER PLANT PROVIDING A FUNCTION OF SUPPRESSING THE DEPOSITION OF RADIOACTIVE SUBSTANCE

BACKGROUND OF THE INVENTION

This invention relates to a nuclear power plant and, more particularly, to a nuclear power plant in which a treatment for suppressing deposition of radioactive substance is performed for structural material to be used while coming into contact with a liquid in which radioactive substance is dissolved, such as a piping of the primary cooling water system.

The piping, pumps, valves, or the like which are used in the primary cooling water system of a nuclear power station are made of stainless steel, Stellite, or the like. When these metals are used for a long period of time, they are subject to corrosion and damage, causing composite metal elements to be dissolved in the primary cooling water and brought into the nuclear reactor. Most of the dissolved metal elements are oxidized and deposited on the fuel rods, where they are irradiated by neutrons. Hence, the radioactive nuclides such as $^{60}$Co, $^{58}$Co, $^{51}$Cr, $^{64}$Mn, etc. are produced. These radioactive nuclides are redissolved in the primary cooling water and float as ions or insoluble solid components (hereinafter, referred to as clads). Portions of the floating clads are removed by a desalting device or the like for purification of the reactor water. However, the remaining clads are deposited on the surface of the structural material consisting mainly of stainless steel while they are circulating in the primary cooling water system. Therefore, a dose rate on the surface of the structural material increases and there is a problem on radiation exposure of workers who perform maintenance and inspection.

Thus, as a method of preventing an increase in the dose rate at the surface of the structural material, the methods of elimination of the radioactive substances deposited on the structural material are studied and carried out. Presently, the eliminating method includes the following three methods.

(1) Mechanical cleaning method
(2) Chemical cleaning method
(3) Cleaning method by electrolysis The method (1) is mainly applied to parts, for example, the surface is cleaned by a high-pressure jet water. However, it is difficult to remove the radioactive substance having a large adhesive property by this method, and is impossible to systematically clean over a wide range. In fact, even if the dose rate were reduced temporarily by this method, the dose rate tends to increase again due to the subsequent use over a long period of time.

According to the method (2), the oxide film on the surface of the steel is dissolved by the chemical reaction using chemicals such as acid solution or the like, thereby removing the radioactive substance existing in the oxide film. This method has a problem of corrosive damage of the structural material due to the chemicals. That is to say, when the oxide film is dissolved, the structural material is also subject to corrosive damage and there is a fear of causing a stress corrosion cracking of the structural material due to the small amount of chemicals remaining after the cleaning.

The method (3) has also the same problem as the method (1).

Furthermore, to reduce the quantity of adhered radioactive substance, it is performed a method of suppressing elution of metal elements which are the sources of radioactive substance. Namely, oxygen or hydrogen peroxide is injected into the water supplying system to suppress the corrosion of the structural material, thereby reducing the amount of corrosive products entering into the nuclear reactor.

However, even if such a method is used, it is impossible to completely prevent the corrosion of the structural material of the primary cooling water system and to eliminate the radioactive substances in the primary cooling water; therefore, a problem on increase in dose rate at the surface due to the deposition of the radioactive substance into the structural material still remains.

SUMMARY OF THE INVENTION

It is an object of the present invention to eliminate such problems and to provide a nuclear power plant which can suppress the deposition of radioactive substances on the structural material to be used in contact with the liquid in which radioactive substances are dissolved by preliminarily forming an oxide film onto the portion that will come into contact with the liquid for such a structural material.

According to the present invention, the above object is accomplished by preliminarily forming an oxide film on the structural material by oxidizing the metal elements constituting the surface layer of the structural material which will come into contact with the liquid in which radioactive substances are dissolved by injecting from outside oxidizing agents.

For this purpose, the present invention has such a feature that the above oxidizing agents comprise at least one kind selected from the group consisting of oxygen, hydrogen peroxide, chromate, nitrite, molybdate, tungstate and ferrate.

DETAILED DESCRIPTION OF THE INVENTION

Figure 1:
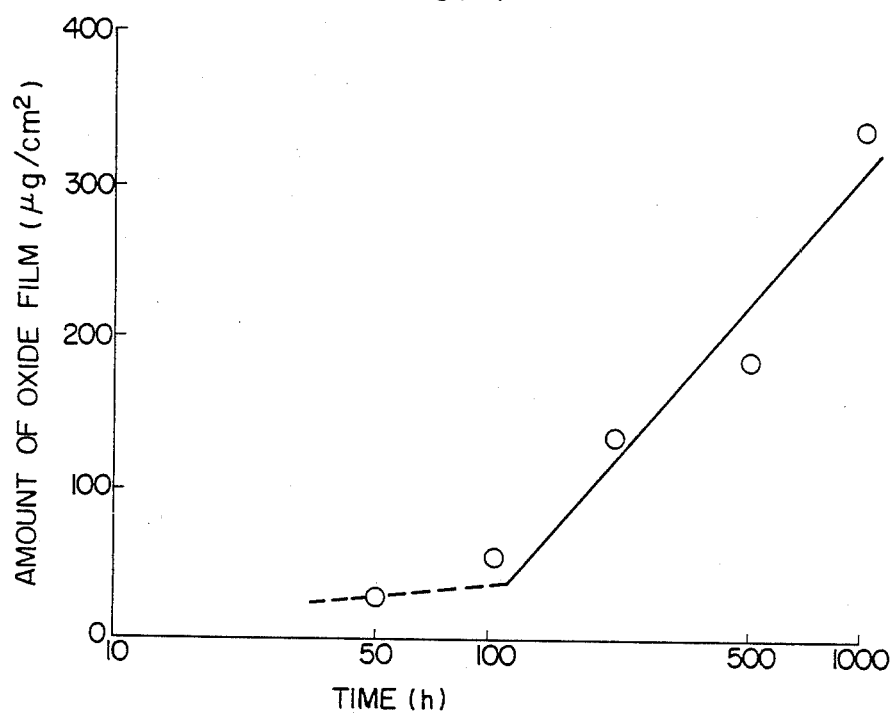
FIG. 1 is a diagram showing a relation between the amount of an oxide film of stainless steel and the time.

It has been found that the main radioactive nuclide which contributes to the exposure of workers concerning a nuclear power plant is $^{60}$Co, from the results of various analyses (for example, G. Romeo, Proceedings of The 7th International Congress on Metallic Corrosion, P1456, 1978). The deca energy strength of Y rays of this radioactive nuclide is so high as to be 1.7 and 1.33 MeV and its half life is so long as to be 5.26 years, so that once it has been deposited on the structural material it becomes a cause of an increase in surface dose rate over a long period of time. Therefore, how the deposition of this $^{60}$Co, is suppressed is a key to reduce the dose rate.

On the other hand, although the structural materials of the pressure vessels, piping, pumps, valves, etc. around the plant reactor consist of stainles steel, Stellite, Inconel, and carbon steel, stainless steel occupies 97 percent of the water contact area. Thus, it is most effective for reduction of exposure to suppress the deposition of radioactive substances onto the stainless steel.

The radioactive nuclide dissolving in the reactor water enters into the oxide film formed on the surface of the stainless steel by corrosion thereof in the process of formation of the oxide film. By the way, according to the study by the present inventors, it has been assumed that suppression of the growth of the oxide film will contribute to a reduction of deposition since there is a relative relation between the depositing rate of the radioactive nuclide and the oxide film growing rate.

An increase in the amount (m) of oxide film of stainless steel under the circumstance of reactor water is represented by the logarithmic law of time (t) as shown in equation (1):

$$m = a \log t + b \qquad \ldots (1)$$

wherein a and b are constants.

That is, with a growth oxide film, its growing rate decreases. Therefore, by preliminarily forming a suitable non-radioactive oxide film, it is possible to suppress the formation of new oxide film after the structural material has been dipped into the liquid in which radioactive substance is dissolved, so that it is possible to suppress the deposition of the radioactive substance which frequently occurs upon formation of oxide film.

By the way, the difficulty in diffusion of radioactive substance into oxide film depends upon the composition and form of the film. Since $^{60}Co$ is a bivalent atom, it relatively easily enters into the oxide film having a crystal structure with bivalent metal. For example, in case of $Fe_2O_4$ having a spinel structure ($M^{II}O \cdot M^{III}_2O_3$), the position of $Fe^{II}$ is substituted by $^{60}Co^{II}$.

Therefore, it has been found that the deposition can be effectively suppressed by preliminarily forming the oxide film which consists mainly of $\alpha\text{-}Fe^{III}_2O_3$, without any bivalent atoms, and the present invention was made.

Examples of the present invention will be described hereinbelow; however, the present invention is not limited to them.

EXAMPLE 1

A stainless steel haviang a chemical composition shown in Table 1 was dipped in the reactor water flowing at a flow rate of 0.5 m/s for 25–1000 hours. The amount of the formed oxide film and the amount of $^{60}Co$ deposited were measured.

TABLE 1

| JIS | Chemical composition (%) | | | | | | | |
|---|---|---|---|---|---|---|---|---|
| | C | Si | Mn | S | Ni | Cr | Co | P |
| SUS304 | 0.06 | 0.76 | 1.12 | 0.023 | 9.11 | 18.07 | 0.22 | 0.029 |

Before the stainless steel is dipped, the surface thereof was machine-worked and thereafter it was degreased and cleaned. A concentration of $^{60}Co$ in the reactor water was $1 \times 10^{-4}$ μCi/ml and not lower than 90% of $^{60}Co$ existed as ions. The temperature was 230° C., dissolved oxygen concentration was 150–170 ppb, and pH was 6.9–7.2.

The principal metal element composition of the oxide film formed when it has been dipped for 1000 hours is shown in Table 2. About 90% is iron element.

TABLE 2

| weight μg/cm² (metal element composition %) | | | |
|---|---|---|---|
| Fe | Co | Ni | Cr |
| 293 (89.1) | 0.940 (0.286) | 10.1 (3.07) | 25.0 (7.60) |

FIG. 1 shows a change in the amount (total amount of iron, cobalt, nickel, and chrome) of the typical metal elements in the oxide film formed per unit area of the stainless steel as a function of time.

It can be seen that the amount of oxide film increases in accordance with the logarithmic law over 100 hours.

Figure 2:
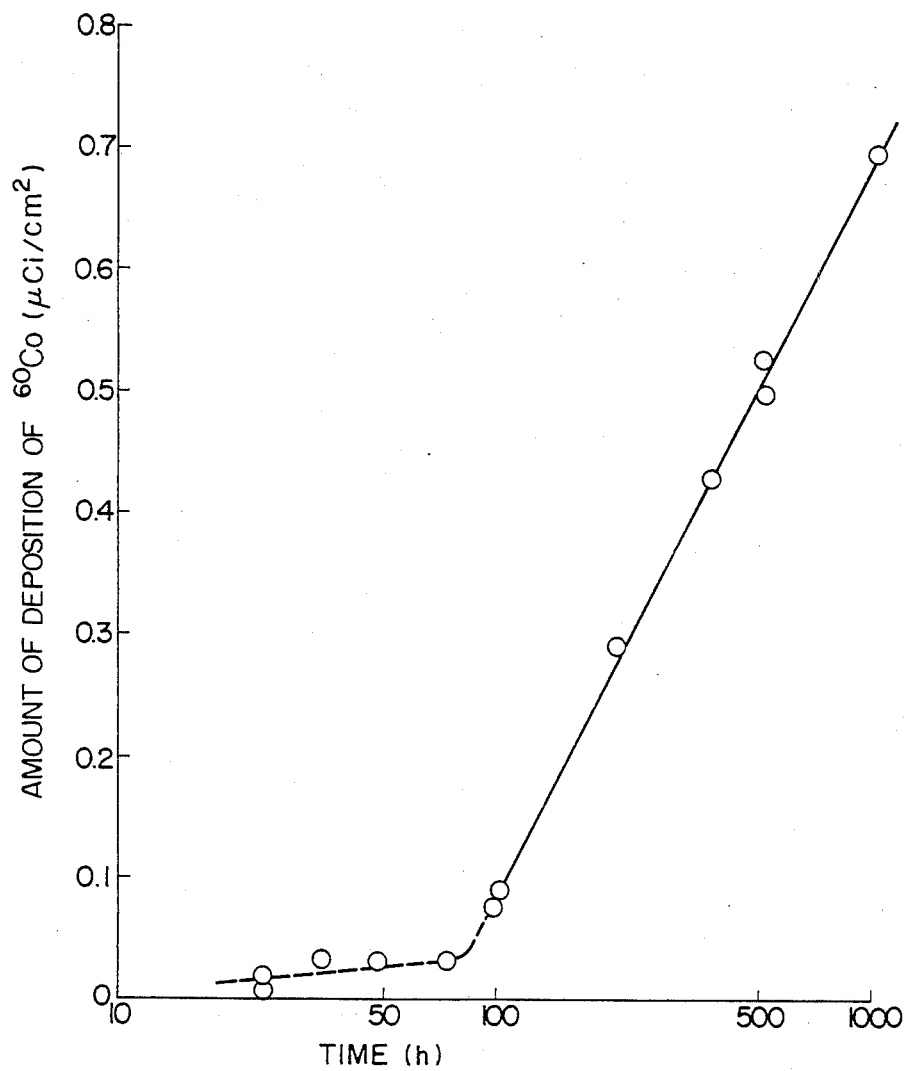
FIGS. 2 and 3 are diagrams showing a relation between the amount of deposition of $^{60}$Co and the time.

On the other hand, FIG. 2 shows a change in the amount of deposition of $^{60}Co$ as a function of time. Similarly to the amount of oxide film, the amount of deposition of $^{60}Co$ increases in accordance with the logarithmic law over 100 hours.

As a result, it will be appreciated from FIGS. 1 and 2 that the depositing rate of $^{60}Co$ complies with the growing rate of oxide film. The oxide film growing rate gradually reduces with its growth.

EXAMPLE 2

The stainless steel similar to that used in Example 1 was dipped in the water under the conditions shown below for 25–500 hours to preliminarily produce the non-radioactive oxide film on the surface.

Figure 3:
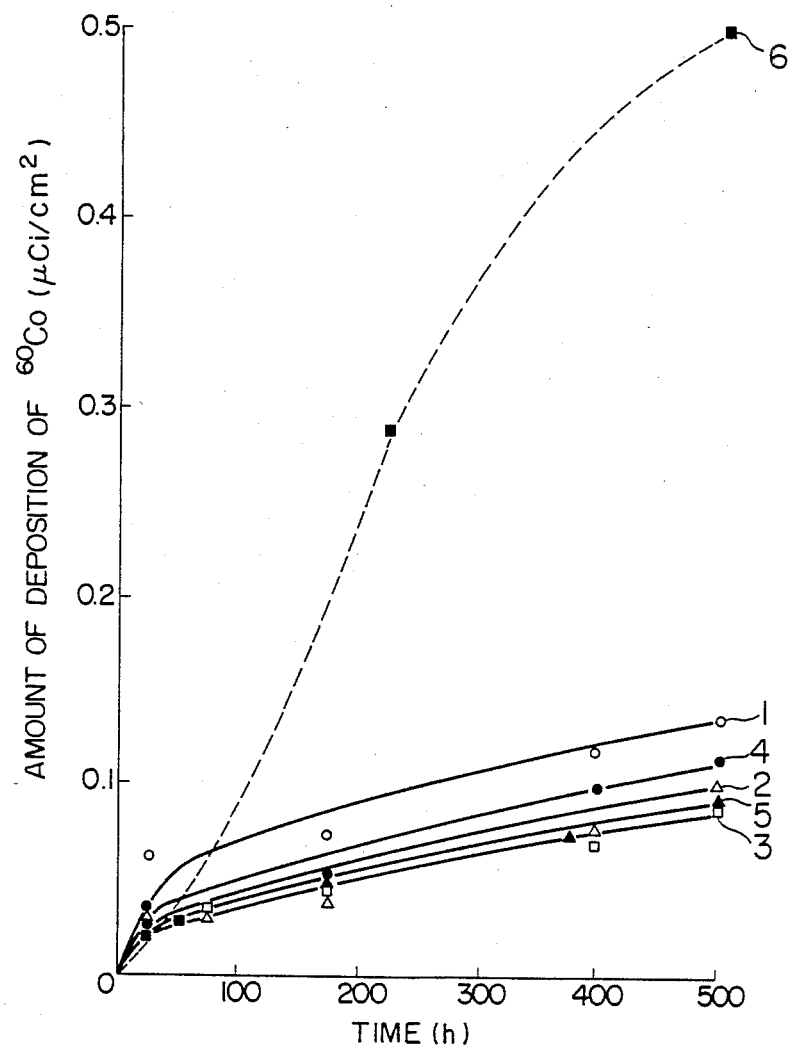

Temperature: 285° C.
Dissolved oxygen concentration: 200 ppb
Electric conductivity: 0.1 μS/cm
Flow rate: 0.1 cm/sec In this way, the stainless steel on which the oxide film consisting mainly of $\alpha\text{-}Fe_2O_3$ has been preliminarily formed by the pre-oxidation treatment was dipped in the reactor water under the same conditions as Example 1, and a change in the amount of deposition of $^{60}Co$ as a function of time was examined. The result is shown in FIG. 3 together with the non-treated stainless steel (curve 6). Curves 1 to 5 respectively show the relations in the cases where the times of pre-oxidation treatment are 25, 50, 100, 200, and 500 hours. When the stainless steel was dipped in the reactor water over 100 hours, the deposition of $^{60}Co$ onto the stainless steel having been subjected to the pre-oxidation treatment was remarkably suppressed.

EXAMPLE 3

Figure 4:
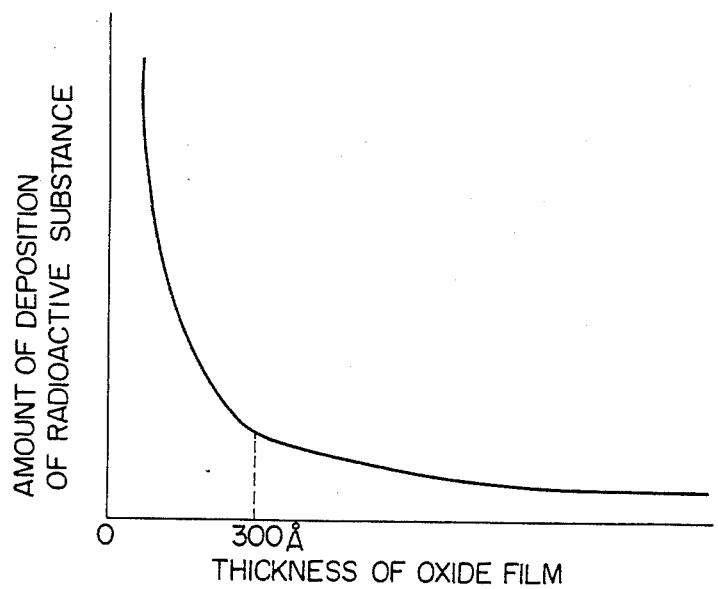
FIG. 4 is a diagram showing a relation between the amount of deposition of radioactive substance and the thickness of oxide film.

FIG. 4 shows a relation between the thickness of oxide film and the amount of deposition of radioactive substance. It will be understood that the deposition can be effectively suppressed by forming an oxide film having a thickness of 300 Å or more by oxidation treatment.

EXAMPLE 4

When the piping, equipment or the like used in a nuclear power plant are cleaned by the chemical method or the like and are used again, the oxide film on the surface of the structural material has been dissolved and peeled off by the cleaning operation. Thus, the metal bare surface is exposed and the amount of deposition of radioactive substance upon reuse shows the time change similar to that of FIG. 2. Therefore, the deposition of radioactive substance can be suppressed by reusing them after the pre-oxidation treatment according to the present invention was performed.

EXAMPLE 5

Although there are many types of nuclear power plants, the present invention can be applied to any of them. For example, in a nuclear power plant of the boiling water reactor, the pressure vessel, piping of the recirculating system, piping of the primary coolant cleaning system or the like come into contact with the reactor water which includes radioactive substances. Further, in a nuclear power plant of the pressurized water reactor, the pressure vessel, structural material in the reactor, steam generator or the like come into contact with the similar reactor water. Therefore, the deposition of the radioactive substances can be suppressed by applying the structural materials having been subjected to the preoxidation treatment of the present invention to all or part of the structural material consisting of one or two or more metals selected from the group of stainless steel, Inconel, carbon steel and Stellite that comes into contact with the liquid containing these radioactive substances. Moreover, it is possible to provide a plant in which an exposure of workers is small.

EXAMPLE 6

The following methods are considered to apply the present invention to the nuclear power plant shown in Example 5.

(1) For the piping, equipment or the like of the small shape, the oxidation treatment can be performed on the structural material by the autoclave treatment in the water containing the oxidizing agents such as oxygen or the like, which were set forth in item (2) before they are installed in the plant.

(2) For the piping, equipment or the like which have been already installed in the plant, the oxidation treatment can be preliminarily performed on the surface which comes into contact with the water by a method of heating the water by introducing the steam at high temperature from outside, or by means of the heat generated by the operation of the pumps that have been already installed, or by a method of adding oxidizing agents such as oxygen, hydrogen peroxide, chromate, nitrite, molybdate, tungstate, ferrate, etc. into the water even at a low temperature.

As will be obvious from the above description, according to the present invention, the deposition of radioactive substances on the structural material consisting of metal can be suppressed by simple means and its applicable range is wide. Particularly, the present invention is suitable to reduce the exposure of workers since it suppresses an increase in dose rate when it is applied to the structural materials including stainless steel that are used in a nuclear power plant. The present invention has a high practical value and is industrially very worthwhile.

We claim:

1. In a nuclear power plant having a cooling system and radioactive coolant in said cooling system, said cooling system including ferrous structural material in contact with said radioactive coolant, wherein the ferrous structural material has a preliminary oxide film formed thereon, by oxidation of the bare surface portion thereof, by contacting bare surfaces of the structural material with flowing water containing an oxidizing agent and no metallic ions, said preliminary oxide film being formed at those portions of the ferrous structural material to be in contact with the radioactive coolant, said preliminary oxide film being formed prior to said structural material contacting said radioactive coolant, said preliminary oxide film consisting essentially of $Fe_2O_3$ and having a thickness of at least 300 Å, whereby later formation of new oxide film while the structural material is in contact with said radioactive coolant is suppressed to thereby suppress deposition of the radioactive substances on the ferrous structural material.

2. A nuclear power plant according to claim 1, wherein said preliminary oxide film is a nonradioactive film.

3. A nuclear power plant according to claim 1, wherein said preliminary oxide film consists of an $\alpha$-$Fe_2O_3$ film.

4. A nuclear power plant according to claim 1, wherein the ferrous material is selected from the group consisting of stainless steel and carbon steel.

5. A nuclear power plant according to claim 1, further comprising means to inject an oxidizing agent to contact said metal to thereby form said preliminary oxide film.

6. A nuclear power plant according to claim 1, wherein said preliminary oxide film is a film formed by contacting said surface portions of the metal with flowing water containing dissolved oxygen, for a time period of 25-500 hours.

7. Structural material comprising a ferrous structural material for a nuclear power plant, adapted to be in contact with liquid having radioactive substances dissolved therein, wherein said ferrous structural material has a preliminary oxide film formed thereon prior to said structural material contacting said liquid, by contacting bare surfaces of the ferrous material with flowing water containing an oxidizing agent and not metallic ions, said preliminary oxide film having a thickness of at least 300 Å and consisting essentially of $Fe_2O_3$, whereby later formation of new oxide film while the structural material is in contact with said liquid is suppressed to thereby suppress deposition of the radioactive substances on the metal.

8. Structural material according to claim 7, wherein said structural material is a piping, pump, or valve for use in the primary cooling water system of said nuclear power plant.

9. A method of suppressing deposition of radioactive substances on ferrous structural material for a nuclear power plant, which ferrous structural material comes into contact with a liquid in which radioactive substances are dissolved, comprising the steps of:

contacting said ferrous structural material having a bare surface of the ferrous material with water containing oxidizing agent in an amount sufficient to form a non-radioactive film on the ferrous structural material, the water containing no metallic ions, the water being flowing water; and forming a non-radioactive oxide film consisting essentially of $Fe_2O_3$ and having a thickness of at least 300 Å on the ferrous structural material, said oxide film suppressing formation of new oxide film, containing radioactive substances, when the structural material is contacted with liquid in which radioactive substances are dissolved.

10. The method of suppressing deposition of radioactive substances according to claim 9, wherein said water containing oxidizing agent is water containing dissolved oxygen, the water containing 200 ppb dissolved oxygen.

11. The method of suppressing deposition of radioactive substances according to claim 10, wherein the flowing water containing oxidizing agent is at a sufficiently high temperature so as to heat the ferrous structural material and cause formation of the non-radioactive oxide film.

12. The method of suppressing deposition of radioactive substances according to claim 9, wherein the flowing water containing oxidizing agent is at a sufficiently high temperature so as to heat the ferrous structural material and cause formation of the non-radioactive oxide film.

13. The method of suppressing deposition of radioactive substances according to claim 12, wherein the water containing oxidizing agent, contacting the ferrous structural material, is under pressure greater than atmospheric pressure.

14. The method of suppressing deposition of radioactive substances according to claim 13, wherein the ferrous structural material is contacted with the flowing water containing oxidizing agent for a period of 25-500 hours.

15. The method of suppressing deposition of radioactive substances according to claim 9, wherein the ferrous structural material is contacted with the flowing water containing oxidizing agent for a period of 25-500 hours.

16. The method of suppressing deposition of radioactive substances according to claim 9, wherein the oxidizing agent is oxygen, dissolved in the water.

17. The method of suppressing deposition of radioactive substances according to claim 9, wherein said oxidizing agent comprises at least one substance selected from the group consisting of oxygen, hydrogen peroxide, chromate, nitrite, molybdate, tungstate and ferrate.

18. The method of suppressing deposition of radioactive substances according to claim 9, wherein said oxide film is an $\alpha$-$Fe_2O_3$ film.

19. The method of suppressing deposition of radioactive substances according to claim 9, wherein said ferrous structural material is selected from the group consisting of stainless steel and carbon steel.

20. The method of suppressing deposition of radioactive substances according to claim 19, wherein said oxide film consists of an $\alpha$-$Fe_2O_3$ film.

21. The method of suppressing deposition of radioactive substances according to claim 9, wherein said oxidizing agent is injected into said flowing water so that it comes into contact with the ferrous structural material.

22. A method of suppressing deposition of radioactive substances on ferrous structural material for a nuclear power plant, which ferrous structural material comes into contact with a liquid in which radioactive substances are dissolved, said ferrous structural material initially having a film containing radioactive substances thereon, comprising the steps of:
   initially chemically removing said film containing radioactive substances so as to clean the ferrous structural material and expose the ferrous material;
   then contacting said ferrous structural material having a bare surface of the ferrous material with water containing an oxidizing agent in an amount sufficient to form a non-radioactive film on the ferrous structural material, the water containing no metallic ions, the water being flowing water; and
   forming a non-radioactive oxide film consisting essentially of $Fe_2O_3$ and having a thickness of at least 300 Å on the ferrous structural material, said oxide film suppressing formation of new oxide film, containing radioactive substances, when the structural material is contacted with liquid in which radioactive substances are dissolved.

23. A method of suppressing deposition of radioactive substances on ferrous structural material for a nuclear power plant, which ferrous structural material comes into contact with a liquid in which radioactive substances are dissolved, comprising the steps of:
   contacting said ferrous structural material having a bare surface of the ferrous material with water containing an oxidizing agent in an amount sufficient to form a non-radioactive oxide film on the ferrous structural material, the water containing no metallic ions, the water being flowing water and having a sufficiently high temperature to heat the ferrous structural material and cause an oxide film to be formed thereon; and
   forming a non-radioactive oxide film consisting essentially of $Fe_2O_3$ and having a thickness of at least 300 Å on the ferrous structural material due to contact of the ferrous structural material with the high temperature water containing an oxidizing agent, said oxide film suppressing formation of new oxide film, containing radioactive substances, when the structural material is contacted with liquid in which radioactive substances are dissolved.

24. A method of suppressing deposition of radioactive substances on ferrous structural material for a nuclear power plant, which ferrous structural material comes into contact with a liquid in which radioactive substances are dissolved, comprising the steps of:
   prior to incorporating the ferrous structural material in the nuclear power plant, contacting said ferrous structural material having a bare surface of the ferrous material with water containing an oxidizing agent in an amount sufficient to form a non-radioactive film on the ferrous structural material, the water containing no metallic ions, the water being flowing water;
   forming a non-radioactive oxide film consisting essentially of $Fe_2O_3$ and having a thickness of at least 300 Å on the ferrous structural material, said oxide film suppressing formation of new oxide film, containing radioactive substances, when the structural material is contacted with liquid in which radioactive substances are dissolved; and
   then installing said ferrous structural material in the nuclear power plant.

25. A method of suppressing deposition of radioactive substances on ferrous structural material installed in a nuclear power plant, which ferrous structural material comes into contact with a liquid in which radioactive substances are dissolved, comprising the steps of:
   contacting said ferrous structural material having a bare surface of the ferrous material, installed in the nuclear power plant, with high temperature water containing an oxidizing agent, the water being at a sufficiently high temperature to heat the ferrous structural material, and containing sufficient oxidizing agents, so as to form a non-radioactive film on the ferrous structural material, said water containing no metallic ions, the water being flowing water; and
   forming a non-radioactive oxide film consisting essentially of $Fe_2O_3$ and having a thickness of at least 300 Å on the ferrous structural material, said oxide film suppressing formation of new oxide film, containing radioactive substances, when the structural material is contacted with liquid in which radioactive substances are dissolved.

26. The method of suppressing deposition of radioactive substances according to claim 25, wherein the water containing an oxidizing agent is heated, so as to heat the ferrous structural material, by means of the heat generated by pumps for pumping the water in the nuclear power plant.

27. A method of suppressing deposition of radioactive substances on ferrous structural material of a boiling water reactor, which ferrous structural material comes into contact with a liquid in which radioactive substances are dissolved, comprising the steps of:

contacting said ferrous structural material having a bare surface of the ferrous material with water containing an oxidizing agent, the water being at a temperature of 285° C., the water containing oxidizing agent in an amount sufficient to form a non-radioactive film on the ferrous structural material, the water containing no metallic ions, the water being flowing water; and forming a non-radioactive oxide film consisting essentially of $Fe_2O_3$ and having a thickness of at least 300 Å on the ferrous structural material, the forming of the non-radioactive oxide film including heating the ferrous structural material due to contacting the ferrous structural material with the water at 285° C., said oxide film suppressing formation of new oxide film, containing radioactive substances, when the structural material is contacted with liquid in which radioactive substances are dissolved.

28. The method of suppressing deposition of radioactive substances according to claim 27, wherein the ferrous structural material is contacted with the water containing an oxidizing agent for 25–500 hours.

* * * * *

UNITED STATES PATENT AND TRADEMARK OFFICE
CERTIFICATE OF CORRECTION

PATENT NO. : 4,722,823
DATED : February 2, 1988
INVENTOR(S) : Honda, et al.

It is certified that error appears in the above-identified patent and that said Letters Patent is hereby corrected as shown below:

On the first page of the patent, left-hand column, between the lines beginning with "[22]" and "[51]", insert the following:

--[30] Foreign Application Priority Data

August 25, 1982   Japan      146111/82--

Signed and Sealed this

Tenth Day of December, 1991

Attest:

HARRY F. MANBECK, JR.

*Attesting Officer*          Commissioner of Patents and Trademarks